United States Patent
Sciulli et al.

(10) Patent No.: US 7,578,210 B2
(45) Date of Patent: Aug. 25, 2009

(54) SENSOR LEG ASSEMBLY FOR A CONTOUR FOLLOWER

(75) Inventors: Felice M. Sciulli, Issaquah, WA (US); Andreas Meyer, Bretten (DE); Robert J. Mann, Puyallup, WA (US); Michael Knaupp, Zaisenhausen (DE); Charles M. Wakefield, Puyallup, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 11/784,338

(22) Filed: Apr. 5, 2007

(65) Prior Publication Data
US 2007/0180939 A1 Aug. 9, 2007

Related U.S. Application Data

(62) Division of application No. 10/922,238, filed on Aug. 19, 2004, now Pat. No. 7,331,842.

(51) Int. Cl.
*G01B 7/28* (2006.01)
*G01B 7/14* (2006.01)
*G01B 7/00* (2006.01)
*G01B 5/20* (2006.01)
*G01D 11/00* (2006.01)

(52) U.S. Cl. ........................... 73/866.5; 33/559
(58) Field of Classification Search ............... 73/866.5, 73/866.1, 104–105; 200/61.42; 33/556–558, 33/559–561; 324/207.2, 262, 207.26
See application file for complete search history.

(56) References Cited

U.S. PATENT DOCUMENTS

| | | | |
|---|---|---|---|
| 2,168,650 A | 8/1939 | Maher | 451/38 |
| 3,909,704 A * | 9/1975 | Schonstedt | 324/345 |
| 3,978,748 A | 9/1976 | Leslie et al. | 83/53 |
| 4,903,578 A * | 2/1990 | Terp | 91/499 |
| 5,207,541 A | 5/1993 | Westerman et al. | 409/179 |
| 5,295,425 A | 3/1994 | Hediger | 83/177 |
| 5,349,788 A | 9/1994 | Nedo et al. | 451/75 |
| 5,575,597 A | 11/1996 | Bailey et al. | 409/201 |
| 5,576,492 A | 11/1996 | Phalin | 73/634 |

(Continued)

FOREIGN PATENT DOCUMENTS

DE 35 04 464 C1 4/1986

(Continued)

*Primary Examiner*—Thomas P Noland
(74) *Attorney, Agent, or Firm*—Seed Intellectual Property Law Group PLLC (57) ABSTRACT

A contour follower includes a plurality of sensors spaced around a waterjet nozzle, each of the sensors being configured to measure a distance between a working surface and a first plane, perpendicular to a longitudinal axis of the nozzle. The sensors may include hall-effect sensors lying in the first plane and magnets lying in a second plane, parallel to the working surface. A detecting circuit processes signals from the sensors to determine an angle of the working surface, relative to the first plane, and a distance between an aperture of the nozzle and the working surface. A collision detection sensor provides a signal in the event the device approaches to within a selected distance of an obstruction in the plane of the working surface. A shield plate blocks and dampens secondary spray-back of cutting fluid occurring at low angles above the working surface.

5 Claims, 10 Drawing Sheets

U.S. PATENT DOCUMENTS

| | | | |
|---|---|---|---|
| 5,681,981 A | 10/1997 | McMurtry | 73/1.73 |
| 5,940,180 A * | 8/1999 | Ostby | 356/498 |
| 6,155,245 A | 12/2000 | Zanzuri | 125/12 |
| 6,379,214 B1 | 4/2002 | Stewart et al. | 451/2 |
| 6,540,586 B2 | 4/2003 | Sciulli | 451/2 |
| 6,705,921 B1 | 3/2004 | Shepherd | 451/2 |
| 6,710,291 B1 * | 3/2004 | Wegener et al. | 219/121.72 |
| 6,766,216 B2 | 7/2004 | Erichsen et al. | 700/160 |
| 6,814,649 B2 | 11/2004 | Schmall | 451/2 |
| 6,852,002 B2 | 2/2005 | Stewart et al. | 451/2 |
| 6,908,372 B2 | 6/2005 | Larsson | 451/75 |
| 7,055,397 B2 * | 6/2006 | Nakajima et al. | 73/862 |
| 2001/0027708 A1 | 10/2001 | Stewart et al. | 83/177 |
| 2002/0066345 A1 | 6/2002 | Shepherd et al. | 83/53 |
| 2003/0037650 A1 | 2/2003 | Knaupp et al. | 83/53 |
| 2003/0037654 A1 | 2/2003 | Sciulli et al. | 83/177 |
| 2004/0048548 A1 | 3/2004 | Shepherd | 451/2 |

FOREIGN PATENT DOCUMENTS

| | | |
|---|---|---|
| DE | 196 17 880 A1 | 10/1996 |
| DE | 198 18 635 A1 | 11/1999 |
| EP | 1 002 595 A2 | 5/2000 |
| WO | WO 95/14905 | 6/1995 |

* cited by examiner

SENSOR LEG ASSEMBLY FOR A CONTOUR FOLLOWER

CROSS-REFERENCE TO RELATED APPLICATION

This application is a divisional of U.S. patent application Ser. No. 10/922,238, filed Aug. 19, 2004, which is currently pending, which application is incorporated herein by reference in its entirety.

BACKGROUND OF THE INVENTION

1. Field of the Invention

This invention is related, generally, to waterjet cutting systems, and, in particular, to a method and apparatus for controlling the orientation and position of a waterjet cutting head with respect to a surface.

2. Description of the Related Art

Waterjet and abrasive-jet cutting systems are used for cutting a wide variety of materials, including stone, glass, ceramics, and various metals, including stainless steel. Such systems are capable of cutting material thicknesses ranging up to and exceeding two inches. Thinner material may be stacked for cutting multiple pieces simultaneously.

In a typical fluid jet cutting system, a high-pressure fluid (e.g., water) flows through a cutting head having a cutting nozzle that directs a cutting jet onto a workpiece. The system may draw an abrasive into the high-pressure fluid jet to form an abrasive jet. The cutting nozzle may then be controllably moved across the workpiece to cut the workpiece as desired. After the fluid jet, or abrasive-fluid jet, generically referred to throughout as a cutting jet, passes through the workpiece, the energy of the cutting jet is dissipated and the fluid is collected in a catcher tank for disposal. Waterjet and abrasive-jet cutting systems of this type are shown and described, for example, in U.S. Pat. No. 5,643,058 issued to Erichsen et al., and assigned to Flow International Corporation of Kent, Wash., which patent is incorporated herein by reference, in its entirety. The '058 patent corresponds to Flow International's Paser 3 abrasive cutting systems.

Figure 1:
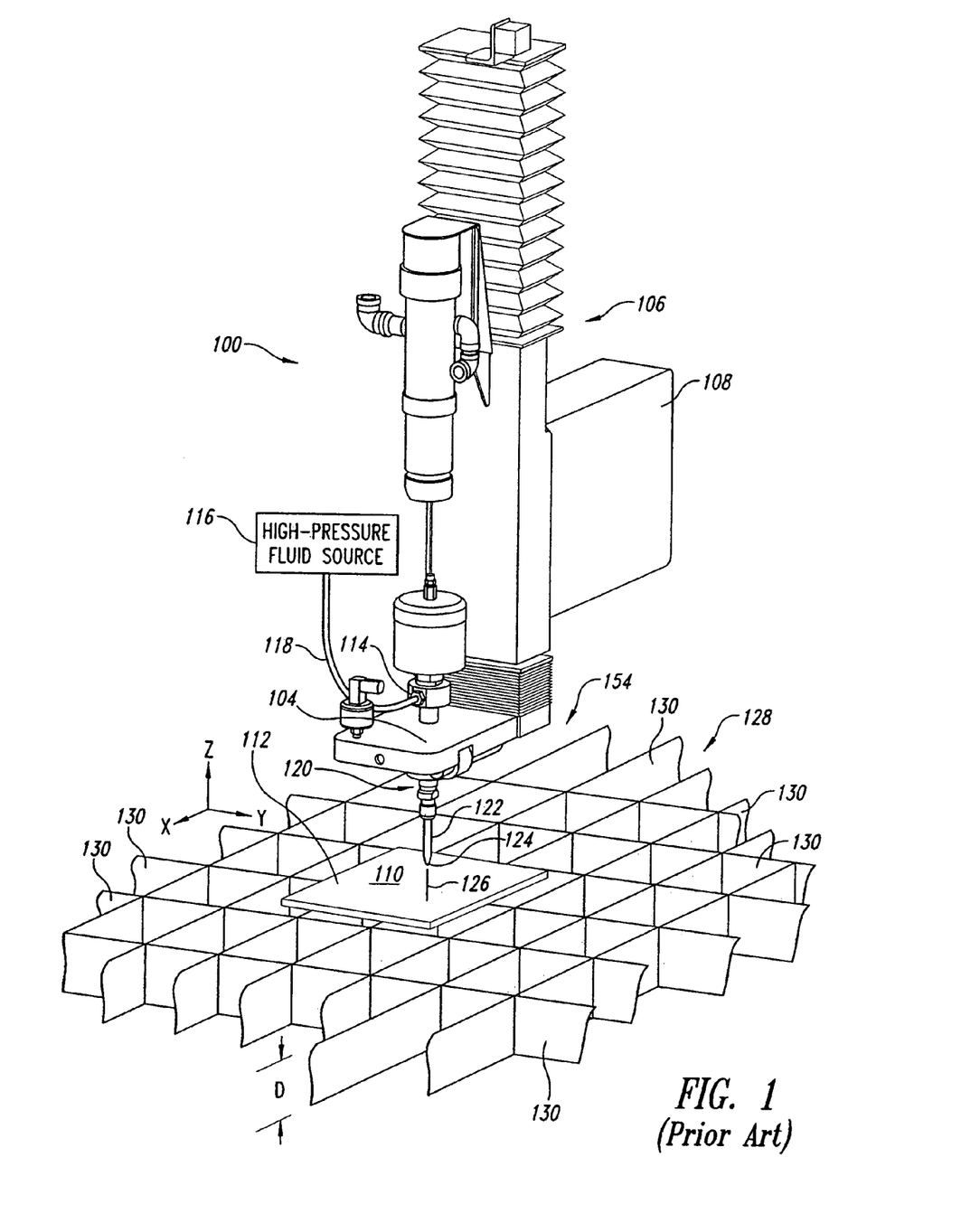
FIG. 1 is an isometric view of a waterjet cutting system provided in accordance with prior art.

FIG. 1 is an isometric view of a waterjet cutting system 100 in accordance with the prior art. The waterjet cutting system 100 includes a cutting head 120 coupled to a mount assembly 104. The mount assembly 104 is controllably driven by a control gantry (not shown in detail) having a drive assembly 108 that controllably positions the cutting head 120 throughout an X-Y plane that is substantially parallel to a surface 110 of a workpiece 112. Typically, the drive assembly 108 may include a pair of ball-screw drives oriented along the X and Y axes, each coupled to an electric drive motor. A Z-axis control mechanism 106 is coupled to the drive assembly and controls the position of the mount assembly in a Z-axis, substantially perpendicular to the surface 110.

Alternatively, the drive assembly 108 may include a five-axis motion system. Two-axis and five-axis control gantries are commercially-available as the WMC (Waterjet Machining Center) and the AF Series Waterjet cutting systems from Flow International of Kent, Wash.

The cutting head 120 includes a high-pressure fluid inlet 114 coupled to a high-pressure fluid source 116, such as a high-pressure or ultrahigh-pressure pump, by a high-pressure line 118. In this embodiment, the cutting head 120 includes a mixing tube 122 terminating in a jet exit port 124, from which a high-pressure stream of fluid, i.e., waterjet 126, is emitted and directed at the workpiece 112.

Although the term "mixing tube" is commonly used to refer to that portion of an abrasive-jet cutting system in which abrasive is mixed with a high-pressure fluid jet to form an abrasive cutting jet, in the following discussion, "mixing tube" may be used to refer to the nozzle through which a jet is discharged, regardless of whether the system uses an abrasive or non-abrasive cutting jet. In addition, the terms "waterjet" or "cutting jet" will be used to refer to the stream of fluid 126, also regardless of whether or not the stream includes abrasive.

A particular challenge in waterjet cutting systems is the provision of an appropriate support for the workpiece, inasmuch as any surface upon which the workpiece is supported will be subjected to the cutting force of the waterjet 126. A common system includes a grid 128 formed by a plurality of slats 130 positioned across a catcher tank (not shown). Upper edges of the slats 130 lie in a plane that is parallel to the X-Y plane. The workpiece 112 is supported on the grid 128 for cutting. A notch 134 (see FIG. 5) is cut into each slat 130 as the waterjet 126, penetrating through the workpiece 112, passes across the slat. The depth of the notch 134 will depend upon factors such as the traverse speed of the waterjet 126, and the thickness and hardness of the workpiece 112. The depth D of the slats 130, as shown in FIG. 1, is selected to tolerate significant exposure to the waterjet 126 as it repeatedly passes across the slat during successive cutting operations. Eventually, damage to the grid 128 reaches a level that the grid 128 must be replaced.

In operation, ultrahigh-pressure fluid is directed through an orifice (not shown) positioned in the cutting head to form an ultrahigh-pressure fluid jet 126. As discussed previously, the system may or may not entrain abrasive into the jet. The jet exits the mixing tube 122, whereby it is directed toward the workpiece 112. The cutting jet 126 pierces the workpiece 112 and performs the desired cutting. Using the control gantry, the cutting head 120 is traversed across the workpiece 112 in the desired direction or pattern.

Figure 2:
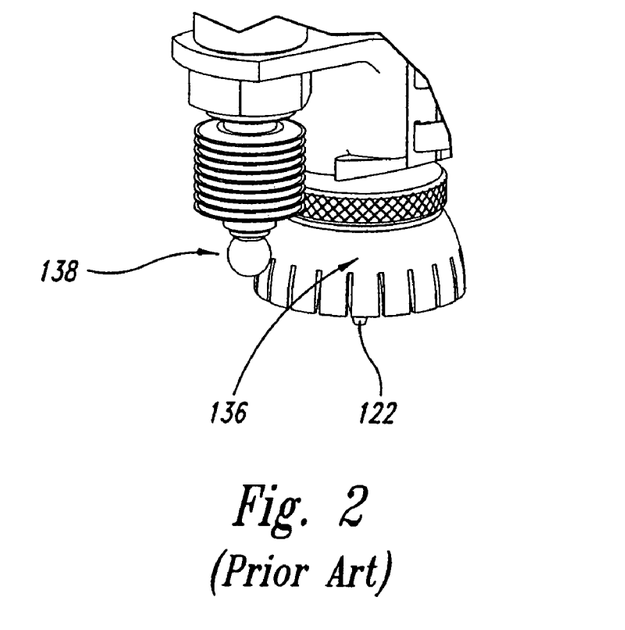
FIGS. 2 and 3 illustrate details of two known waterjet cutting systems.
Figure 3:
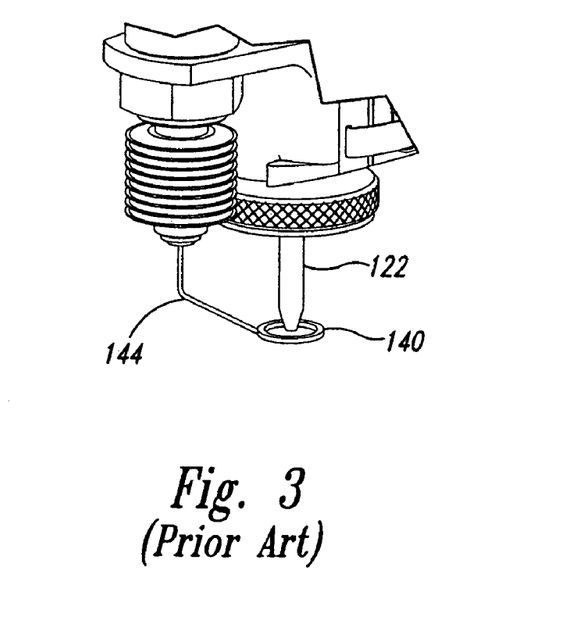

To maximize the efficiency and quality of the cut, a standoff distance S (see FIG. 5) between the jet exit port 124 of the mixing tube 122 and the surface 110 of the workpiece 112 is controlled. If the standoff distance S is too small, the mixing tube 122 can plug during piercing, causing system shutdown and possibly a damaged workpiece 112. If the distance is too great, the quality and accuracy of the cut suffers. FIGS. 2 and 3 illustrate two known devices for determining the position of the workpiece relative to the mixing tube 122, for the purpose of establishing standoff D. The devices described with reference to FIGS. 2 and 3 are described in more detail in U.S. Patent Publication No. 2003/0037650 in the name of Knaupp et al. and assigned to Flow International Corporation of Kent, Wash., which publication is incorporated herein by reference, in its entirety.

The probe 138 of FIG. 2 is configured to extend, via actuation of a pneumatic cylinder, until it touches the surface 110 of the workpiece 112. The height of the surface 110 is thereby ascertained, the probe 138 is then withdrawn, the mixing tube 122 is positioned appropriately in the Z-axis, and cutting commences. FIG. 2 also shows a shield 136, configured to capture a significant amount of spray-back that occurs during a piercing operation, as described in more detail below.

The contact ring 140 of FIG. 3 is positioned coaxially with the mixing tube 122 and coupled to an actuator via a cantilevered rod 144. The contact ring 140 is configured to descend along the axis of the mixing tube 122 until it contacts the surface 110 of the workpiece 112. The height of the surface 110 having been established, the contact ring 140 may then be withdrawn or may be configured to remain in contact or near contact with the surface 110 during the cutting operation.

Because a sensor associated with the contact ring 140 is capable of continuously monitoring the height of the surface 110, the associated cutting system can correct for changes in height of the workpiece 112. However, a device such as the shield 136 of FIG. 2 cannot be used concurrently with the contact ring 140.

When the system 100 is properly configured, and it cuts a continuous line through a workpiece 112, virtually all of the cutting fluid passes through the workpiece 112 to be captured in the catcher tank below. However, at the beginning of a cut while the waterjet 126 is impinging on a surface, but has not yet penetrated the surface, spray-back occurs, in which some or all of the fluid rebounds upward. Primary spray-back occurs while the waterjet 126 is first piercing the workpiece 112. In particular, a large portion of the primary spray-back occurs along an angle reciprocal to the angle of the waterjet 126, and thus, returns directly upward to the cutting device. This high-angle component of the spray-back also retains a significant fraction of the initial energy. Accordingly, it can be very damaging to components of the cutting system, especially in systems employing abrasives in the fluid stream.

FIG. 2 illustrates a spray-back shield 136 according to known art (described in more detail in the '650 publication). The shield 136 is configured to block and dampen the high-angle portion of spray-back and substantially prevents damage to components of the cutting system by the spray-back, and potential damage or injury to objects in the path of the spray-back.

Figure 4:
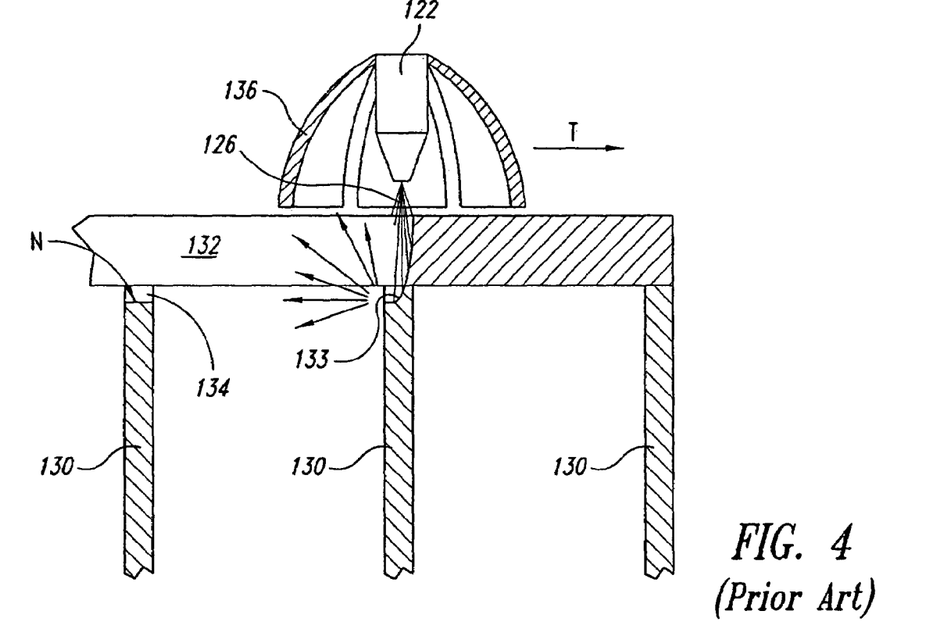
FIG. 4 illustrates a waterjet cutting through a workpiece, according to known art.

As previously described, spray-back occurs when the waterjet 126 impinges but does not fully penetrate a surface. FIG. 4 illustrates a waterjet 126 traveling in direction T and cutting through a workpiece, and into slats 130 of the grid 128. The waterjet 126 loses energy as it passes through the workpiece, and cuts a notch 134 into the slats 130 to a depth N at which the energy of the waterjet 126 is insufficient to cut any deeper, although the energy remaining in the stream is still substantial. It may be seen that the advancing front 133 of the notch 134 has a curved shape as the waterjet 126 traverses the notch, while the bottom of each notch 134 is substantially horizontal.

For the purpose of this description, primary spray-back is that resulting from reflectance of the waterjet by a workpiece, while secondary spray-back results from reflectance of the waterjet by a structure beneath the workpiece.

Unlike the primary spray-back of a piercing operation, secondary spray-back, as illustrated in FIG. 4, is reflected back by the curved front 133 of the notch 134 in a fan shaped spray, in a direction substantially opposite the direction of travel T. The spray-back shield 136 captures only the highest-angle portion of the secondary spray-back. In some cases, depending on factors such as the speed, direction of travel T, the condition of the slat 130, the angle of the cut with respect to the slat 130, etc., a portion of the secondary spray-back can blast back through the kerf 132 of the workpiece 112 at a low angle and travel some distance from the cutting site. This kind of spray-back will be attenuated if the system is cutting a curved line, since the curved wall of the kerf will block some or all of the spray-back.

The most powerful secondary spray-back occurs when the direction of travel T is incident to the slat 130, that is, when the direction of travel T is parallel to the slat 130, and directly above, such that the waterjet 126 passes through the workpiece 112 and impinges directly on the upper surface of the slat 130 for an extended distance. In this configuration, very little of the cutting fluid can escape downward into the catcher tank, and so is driven upward through the kerf 132.

The mixing tube 122 is typically fabricated of specially formulated carbides to resist wear. Particularly for abrasive cutting systems, the mixing tube 122 suffers extreme wear due to its constant contact with high velocity abrasives. Thus, mixing tubes are a relatively expensive component of the system. The specially formulated carbides may also be brittle, and can easily break if the mixing tube 122 collides with an obstruction during operation of the cutting system 100, such as fixturing or cut-out portions of the workpiece 112 which may have been kicked up during the cutting operation. Accidental breakage of the mixing tube 122 increases operational costs and downtime of the cutting system 100.

Several collision sensor systems are known in the art. For example, a ring sensor, similar in appearance to the annular sensor 140 of FIG. 3, may be positioned in contact with, or just above the surface of a workpiece during a cutting operation. An obstruction will make contact with the ring portion of the sensor prior to contacting the mixing tube 122. The sensor is configured to respond to contact with the obstruction by initiating a shut down of at least the drive motors of the cutting system, and generally the waterjet 126 as well, to prevent damage to the mixing tube 122, and minimize damage to the workpiece.

Another collision detection system comprises a device having a portion of the cutting head configured to break away without damage to the mixing tube, in the event of a collision. The system is described in detail in U.S. Pat. No. 6,540,586, issued to Felice Sciulli et al., and assigned to Flow International Corporation of Kent, Wash., which patent is incorporated herein by reference, in its entirety.

Manipulating a jet in five axes may be useful for a variety of reasons, including, for example, cutting a three-dimensional shape. Such manipulation may also be desired to correct for cutting characteristics of the jet or for the characteristics of the cutting result. More particularly, as understood by one of ordinary skill in the art, a cut produced by a jet, such as the abrasive waterjet 126 of FIGS. 1-4, has characteristics that differ from cuts produced by more traditional machining processes.

Figure 5:
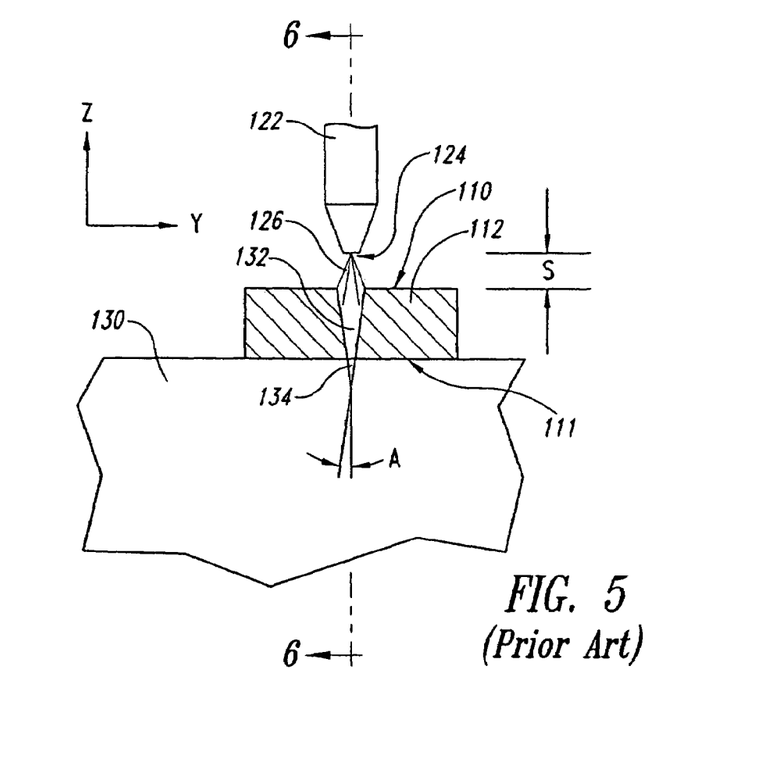
FIGS. 5 and 6 show typical cutting characteristics of waterjet cutting systems.

Two of the cut characteristics that may result from use of a high-pressure fluid jet are referred to as "taper" and "trailback." FIG. 5 shows an exemplary illustration of taper. The mixing tube 122 of FIG. 5 is traveling along an X-axis, perpendicular to the plane of the drawing. Taper refers to the angle A of a plane of one wall of the kerf 132 relative to a vertical plane. Taper typically results in a workpiece 112 that has different dimensions on the top surface 110 (where the jet 126 enters the workpiece) and the bottom surface 111 (where the jet 126 exits the workpiece).

Figure 6:
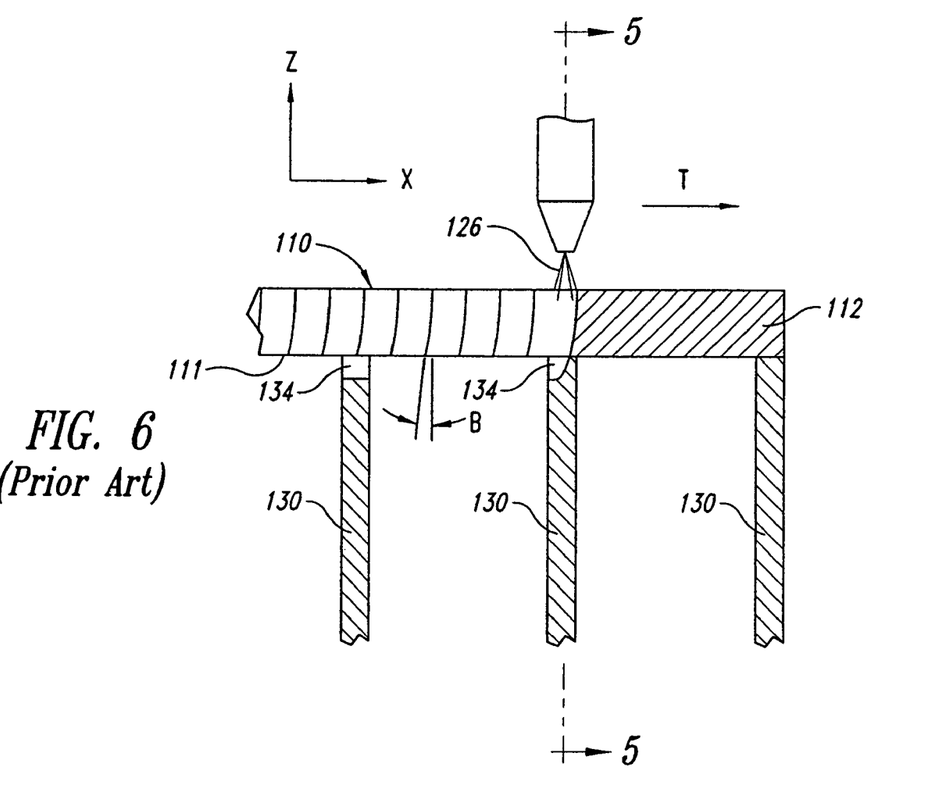

FIG. 6 shows an example of trailback. The mixing tube 122 of FIG. 6 is traveling in direction T along the X-axis, parallel to the plane of the drawing. Trailback, also referred to as drag, is a condition in which the high-pressure fluid jet 126 exits the bottom surface 111 of the workpiece 112 at a point behind the point of entry of the jet 126 on the top surface 110 of the workpiece 112, relative to the direction of travel T. The trailback angle is the angle B of a line extending through a point of entry to a point of exit of the jet 126 relative to a vertical line.

These two cut characteristics, namely taper and trailback, may or may not be acceptable, given the desired end product. Taper and trailback vary, depending upon the thickness and hardness of the workpiece 112 and the speed of the cut. Thus, one known way to control excessive taper and/or trailback is to slow down the cutting speed of the system. Alternatively, in situations where it is desirable to minimize or eliminate taper and trailback while operating at higher cutting speeds, five-axis systems may be used to apply taper and lead angle corrections to the jet 126 as it moves along the cutting path, as illustrated in FIGS. 7 and 8.

Figure 7:
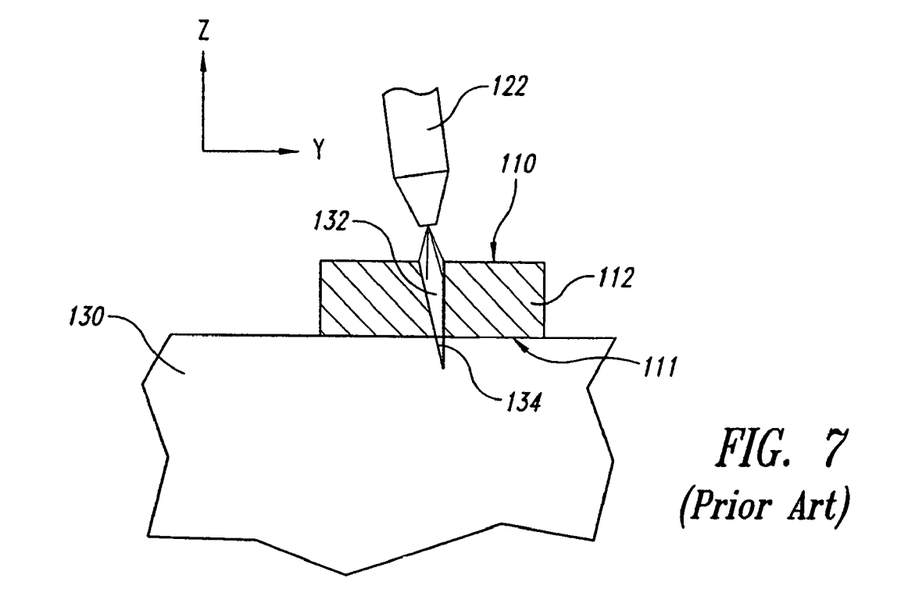
FIGS. 7 and 8 show methods of compensation for characteristics pictured in FIGS. 5 and 6.

It will be assumed, for the purpose of this description, that the portion of the workpiece to the right of the mixing tube 122 of FIG. 7 comprises the finished product, while the portion to the left is scrap. The mixing tube 122 is rotated around an axis parallel to the X-axis, until the right wall of the kerf 132 is substantially vertical.

Figure 8:
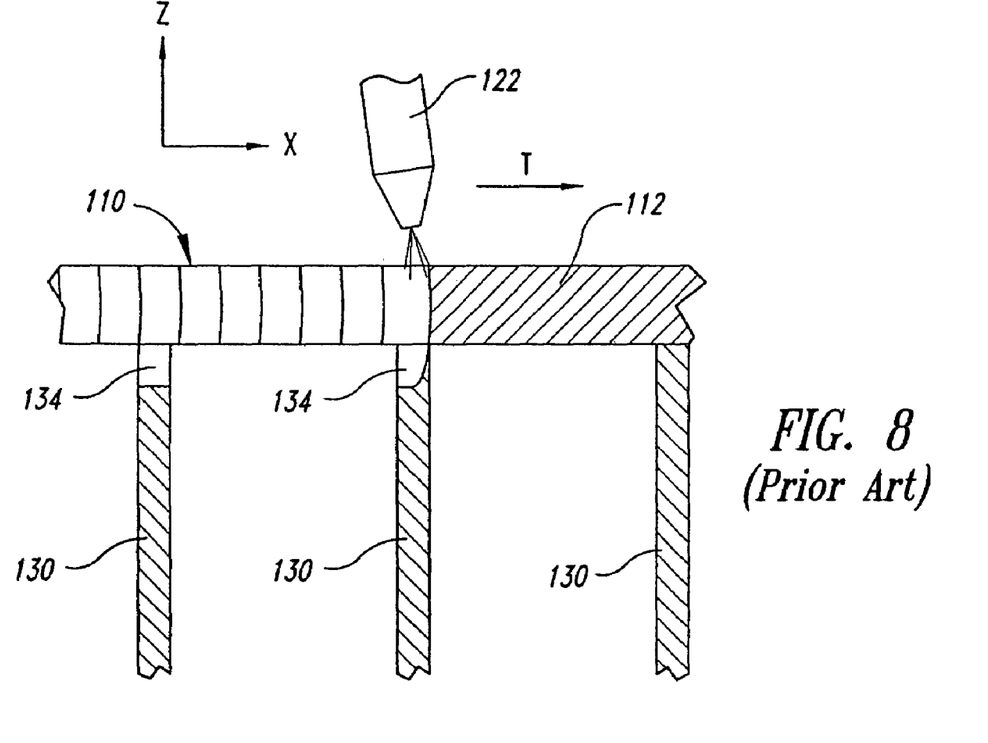

As shown in FIG. 8, the mixing tube 122 is rotated around an axis parallel to the Y-axis, such that the waterjet 126 is angled into the direction of travel T until the trailback is substantially eliminated, as shown.

It will be recognized that, as the direction of travel T changes during the course of a cutting operation, the fourth and fifth axis rotations compensating for taper and trailback must change accordingly. A method and system for automated control of waterjet orientation parameters is described in U.S. Pat. No. 6,766,216 issued to Erichsen et al., and assigned to Flow International Corporation of Kent, Wash., which patent is incorporated herein by reference, in its entirety.

BRIEF SUMMARY OF THE INVENTION

According to an embodiment of the invention, a contour follower device is provided, for use with a tool configured to travel along first, second, and third axes. The tool may be part of a waterjet cutting system or other system in which determination of position, distance or angle of a working surface may be advantageous. In the case of a waterjet cutting system having a cylindrical member with an exit aperture, the device includes a plurality of sensor legs having first and second ends, the first ends coupled to the tool at respective leg positions evenly spaced around the cylindrical member in a first plane perpendicular to an axis of the cylindrical member, each of the sensor legs being configured to change in length in response to variations of displacement of the respective second ends, the second ends of the plurality of sensor legs together defining a second plane. The device also includes a plurality of sensors, each positioned adjacent to a respective one of the plurality of sensor legs and configured to sense a length of the respective sensor leg.

According to an embodiment of the invention, each of the plurality of sensor legs comprises a cylinder coupled to the device at the respective leg position and a sensor shaft having a selected length and first and second shaft ends, the first shaft end being positioned in the respective cylinder, the second shaft end extending therefrom, each of the plurality of sensor shafts being configured to move axially within the respective cylinder in response to variations of displacement of the second end of the respective sensor leg. The first end of the sensor shaft of each of the plurality of sensor legs comprises a magnet and each of the plurality of sensors comprises a hall-effect sensor configured to interact with the respective magnet. A bellows, substantially enclosing the respective cylinder and sensor shaft, is provided for each of the sensor legs. Each of the respective bellows is configured to permit travel of the sensor shaft within the cylinder. A hermetic seal between the respective sensor leg and the device is provided, and the device further comprises a gas channel configured to permit passage of gas to and from each of the plurality of sensor legs as each of the respective sensor legs expands or contracts.

Processing means is provided for processing a signal provided by at least one of the plurality of sensors and establishing a distance from the second plane to the exit aperture of the cylindrical member, along the axis of the member. The processing means may also include means for controlling movement of the tool in the third axis, and may further include means for establishing an angle of the second plane relative to the first plane, and controlling movement of the tool around fourth and fifth axes lying in a plane parallel to the first and second axes.

According to an embodiment of the invention, a plate is provided, coupled to the second end of each of the plurality of sensor legs, an aperture traversing the plate from a first side to a second side in a location corresponding to a position of the exit aperture of the cylindrical member. The plate is configured to block secondary spray-back of the waterjet cutting system.

According to an embodiment of the invention, a collision detection sensor is coupled to the device and configured to provide a signal in the event the tool approaches to within a selected distance of an obstruction along the first and second axes. The collision detection sensor may include a plurality of trigger legs arranged in a circle, the circle lying in a plane parallel to the second plane, each of the trigger legs configured to activate the signal when moved inward toward the tool.

According to an embodiment of the invention, a brush foot is provided, coupled to the second end of each of the plurality of sensor legs, and having a substantially circular support ring and a plurality of bristles coupled to, and extending from, the support ring with outer ends of each of the plurality of bristles collectively defining a third plane parallel to the second plane. The brush foot is configured to contact a work surface with the outer ends of at least some of the plurality of bristles, such that a change in angle of the work surface relative to the first plane is transmitted, via the brush foot, to the plurality of sensor legs and reflected in a corresponding change in length of each plurality of sensor legs.

According to another embodiment of the invention, a method of operation is provided.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

DETAILED DESCRIPTION OF THE INVENTION

While many of the challenges associated with waterjet machining have been described in the background section, there is at least one issue that has not yet been addressed. It has previously been assumed, for the purpose of determining the appropriate position of the mixing tube 122, that the upper surface 110 of the workpiece 112 will be substantially horizontal, or will lie in a plane that is parallel to the X-Y plane. Most sensors configured to determine the position of the upper surface 110 make that determination prior to the beginning of a cutting operation, such as the sensor described with reference to FIG. 2. Even in the case of the sensor described with reference to FIG. 3, which can be configured to continually track the surface 110 of the workpiece 112 as the cutting operation progresses, such a sensor can only detect changes in height of the upper surface 110, and cannot determine the angle of that surface, with respect to the X-Y plane.

Accordingly, errors in cutting angle, that is, the angle at which the waterjet 126 impinges the surface 110, may be introduced into the cutting process because the system is incapable of compensating for variations in surface angle of the workpiece. Some materials that are commonly machined using waterjet processes may be less than perfectly planar. For example, large pieces of sheet metal may have significant changes in elevation and contour over the width and breadth of the piece. Additionally, as a cutting operation progresses, the surface may shift and flex. For example, the balance of internal stresses that are inherent in the crystalline structure of a steel member may suddenly change, causing a portion of a large piece of sheet metal to suddenly flex, altering the relative height and angle of the upper surface thereof. Systems that do not continually monitor the height of the upper surface are subject to a collision of the mixing tube against a suddenly raised portion of the surface, while even systems that do monitor such a height, cannot compensate for the change in surface angle, relative to the cutting angle.

Various features and embodiments of the invention will be described now, with reference to FIGS. 9-14.

Figure 9:
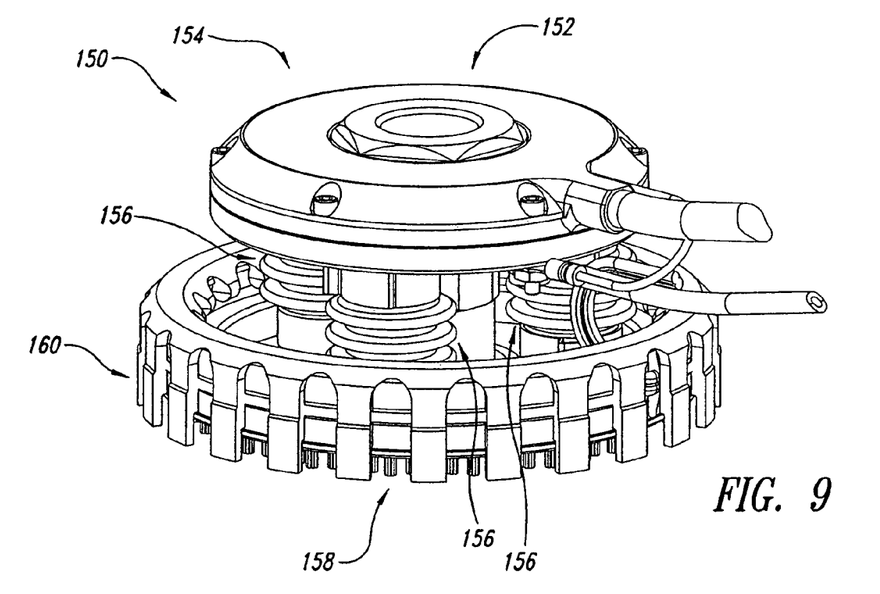
FIG. 9 is an orthographic view of a contour follower assembly according to an embodiment of the invention.

FIG. 9 is an orthographic view of a contour follower assembly 150 according to an embodiment of the invention. The contour follower 150 comprises a plurality of subassemblies, including a nozzle nut assembly 152, a printed circuit board (PCB) assembly 154, a plurality of sensor leg assemblies 156, a foot plate assembly 158, and a collision sensor assembly 160. The embodiment described herein includes three sensor legs, though the invention is not limited to that number.

Figure 10:
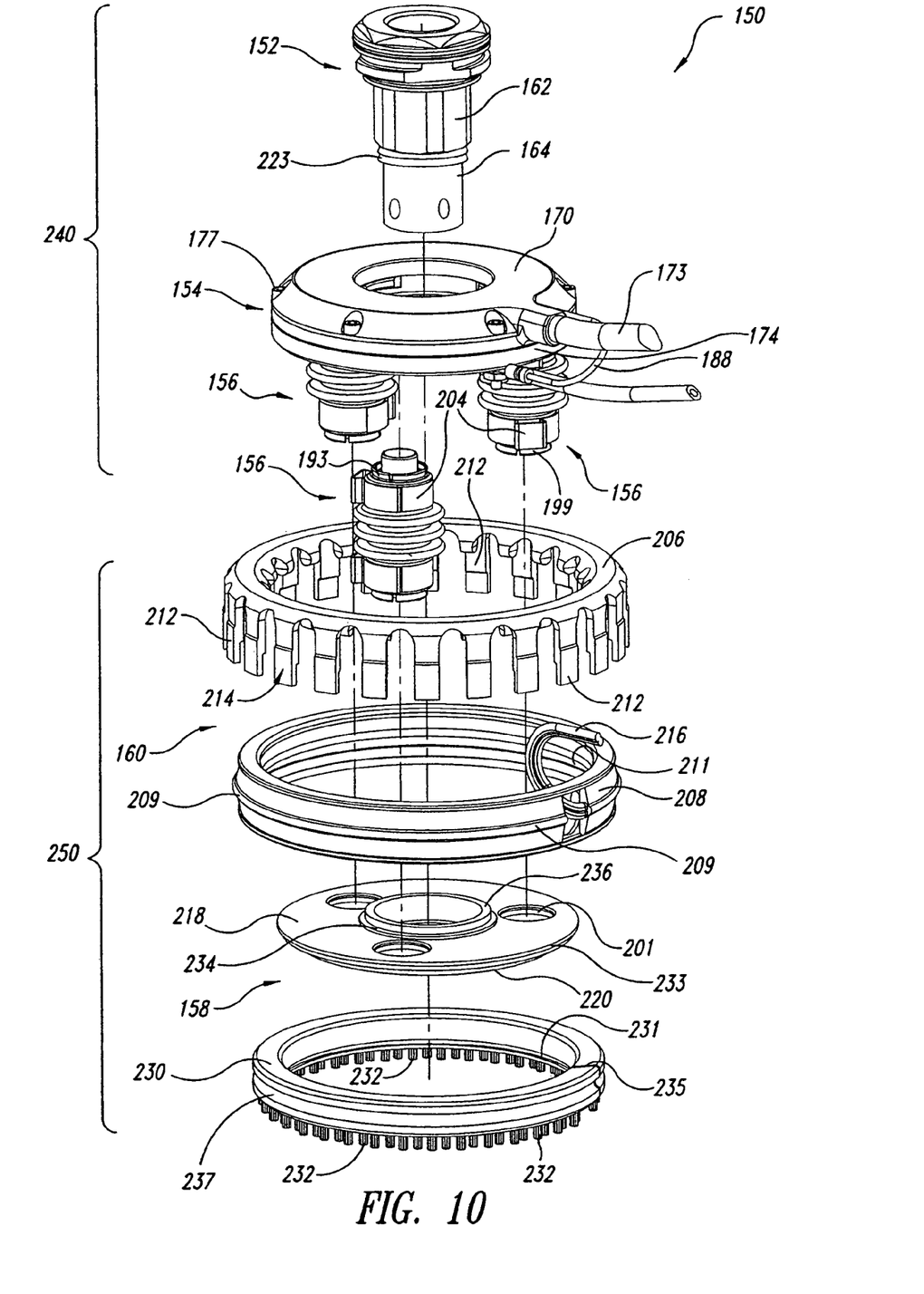
FIG. 10 is a partially exploded view of the contour follower of FIG. 9.
Figure 11:
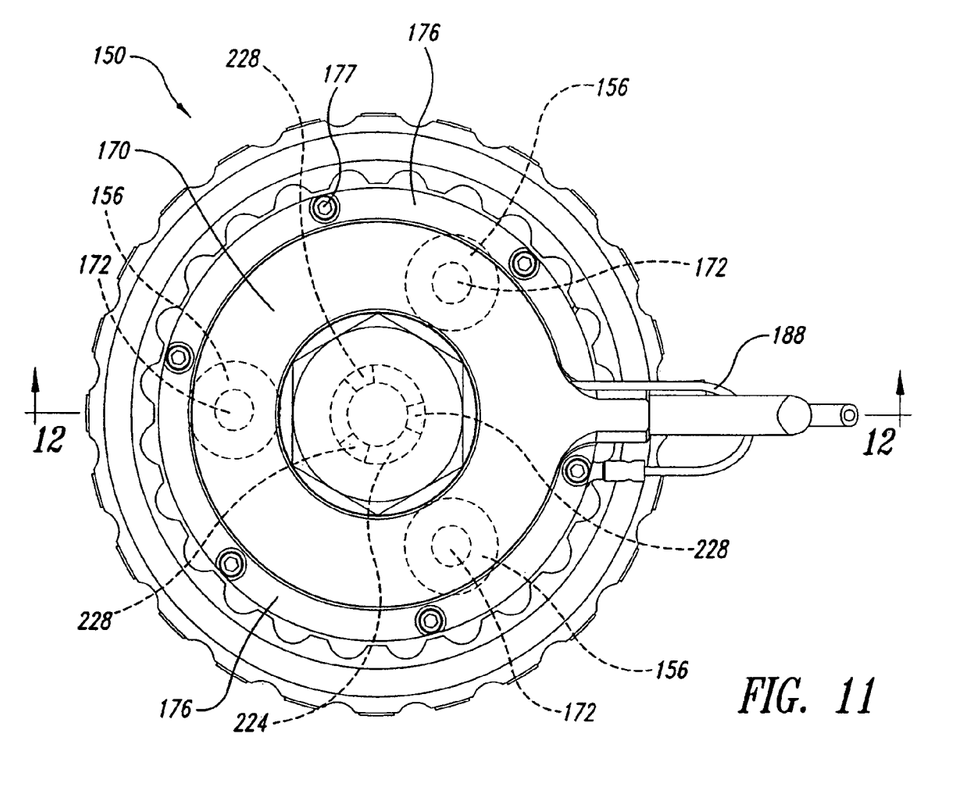
FIG. 11 is a plan view of the contour follower of FIG. 9.

FIG. 10 is a partially exploded view of the contour follower 150, providing additional detail, with respect to the various assemblies, and their respective positions. FIG. 11 is a plan view of the contour follower 150, showing relative positions of many of the components, including the sensor leg assemblies 156, in hidden lines. Details of the nozzle nut assembly 152 that would normally be visible in plan view have been omitted to permit a clearer viewing of features of a carbide sleeve 224, shown in hidden lines.

Figure 12:
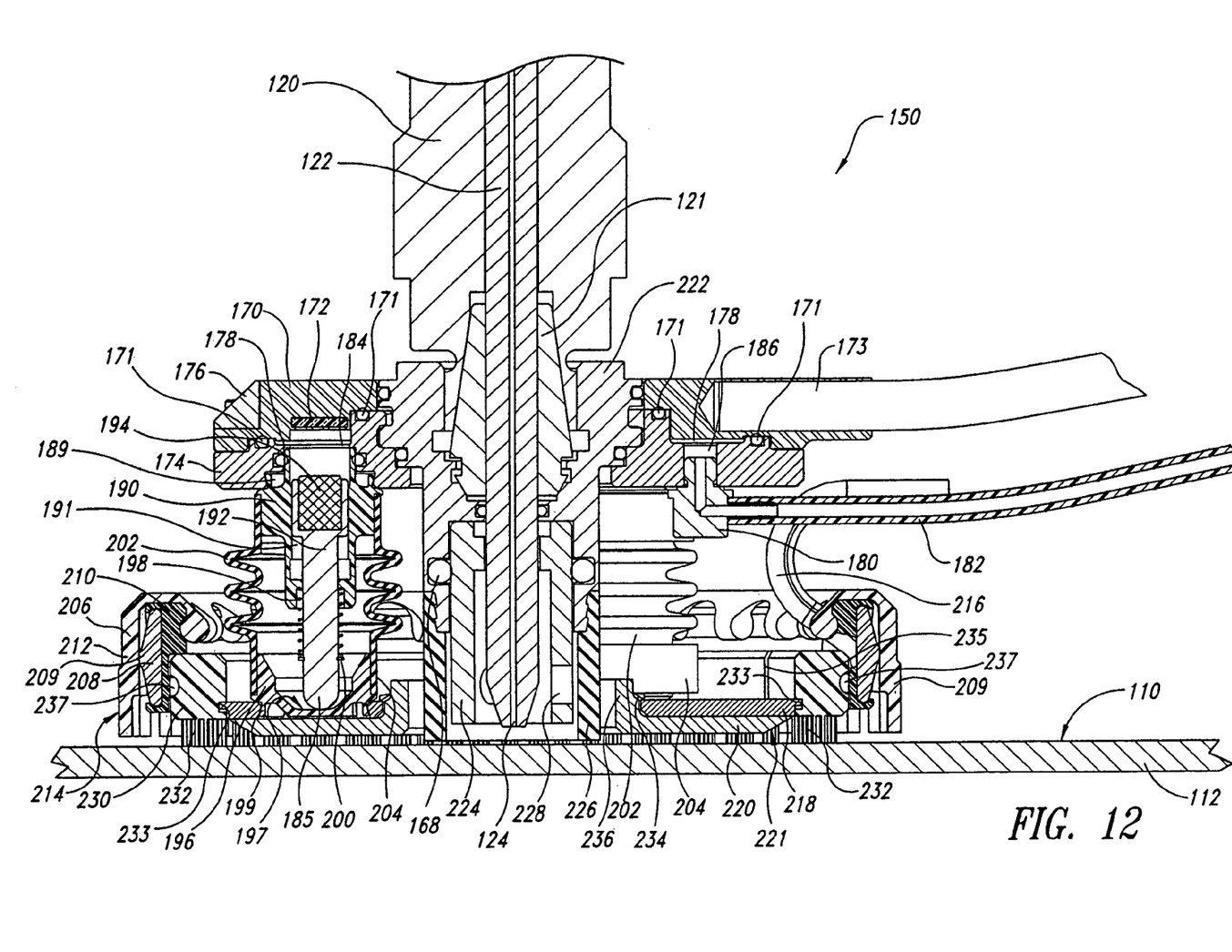
FIG. 12 is a cross-section of the contour follower of FIG. 9, taken along lines 12-12 of FIG. 11.

Referring now to FIG. 12, a cross-section of the contour follower 150 is shown, taken along lines 12-12 of FIG. 11. As shown in FIG. 12, the cutting head 120 is provided with a collet 121 coupled coaxially to the mixing tube 122. The nozzle nut assembly 152 includes a nozzle nut 222 configured to engage the collet 121, thereby coupling the contour follower 150 with the cutting head 120 and the mixing tube 122. The nozzle nut assembly 152 further includes a carbide sleeve 224 and a resilient sleeve 226. O-ring 168 provides for an interference fit between the carbide sleeve 224 and the nozzle nut 222, and is sufficient to hold the carbide sleeve securely during operation. The nozzle nut 222 is further provided with barbs 223 configured to receive the resilient sleeve 226 thereon. The resilient sleeve 226 may be formed of natural or synthetic rubber, or other similar resiliently yielding material.

As previously described, high-angle primary spray-back occurs with great force while the waterjet is first piercing the workpiece. The carbide sleeve 224 serves to capture and dampen this spray-back. Fluid relief apertures 228 vent a portion of the fluid through the wall of the carbide sleeve 224. The plan view of FIG. 11 shows the carbide sleeve 224 and the fluid relief apertures 228 in hidden lines. It may be seen that the fluid relief apertures 228 are oriented so that abrasive fluid exiting through the apertures 228 is directed between the sensor leg assemblies 156, preventing possible damage thereto.

Resilient sleeve 226 provides final damping to fluid exiting the fluid relief apertures 228. The resilient sleeve 226 is loosely fitted around the carbide sleeve 224, such that passage of the fluid is not impeded, but energy is dampened. Some components of the contour follower 150 are described as being formed of a particular material. Such descriptions are for illustration only. For example, the carbide sleeve 224 may be formed of any material capable of withstanding the erosive effects of the spray-back, including other high-hardness metals, resilient materials, or even plastics. Similarly, other references to particular materials in describing an embodiment of the invention should not be considered limiting, with respect to the scope of the invention.

The PCB assembly 154 comprises a resin or polymer encased printed circuit board (PCB) 170. In one embodiment, PCB 170 includes a plurality of hall-effect sensors 172, each positioned directly above one of the plurality of sensor legs 156, as shown in FIG. 11. The hall-effect sensors together define an upper machine plane U that lies perpendicular to an axis of the mixing tube 122.

The resin or polymer encasement of the PCB 170 renders the PCB impervious to contamination by various materials and substances, especially waterjet cutting fluid and abrasives, such as are ubiquitous during normal cutting operations. Power and control are supplied to the PCB 170 via cable 173, whose extreme end is also encapsulated with the PCB 170. A grounding strap 188 grounds the PCB 170 to a housing plate 174. PCB 170 is mounted on the housing plate 174, which is in turn coupled to the nozzle nut 222, and thereby maintained in a plane that lies substantially perpendicular to an axis of the mixing tube 122. A clamp ring 176 engages a perimeter of the PCB 170. Fasteners 177, passing through apertures in the clamp ring 176 and the PCB 170, engage threaded apertures in the housing plate 174 to retain the clamp ring 176 and the PCB 170. The shapes of the PCB 170 and the housing plate 174 cooperate with each other so as to fit snugly together. An annular channel 178 is defined by a narrow gap between the PCB 170 and the housing plate 174. O-rings 171, positioned in annular grooves formed in the housing plate 174, seal the annular air channel 178, preventing the entry of fluid or other contaminants.

The housing plate 174 includes a plurality of sensor apertures 184 and a vent aperture 186, each in fluid communication with the annular channel 178. An elbow fitting 180 is coupled to the vent aperture 186 and a vent tube 182 is coupled to the elbow fitting 180 as shown. The vent tube 182 has a length sufficient, that a second end thereof is positioned well away from the contour follower 150 and the mixing tube 122, and thus is not susceptible to the entry of contaminants such as cutting fluids and abrasives. Accordingly, air is free to enter the air channel 178 via the elbow fitting 180 and the vent tube 182 without admitting contaminants therethrough.

Figure 13:
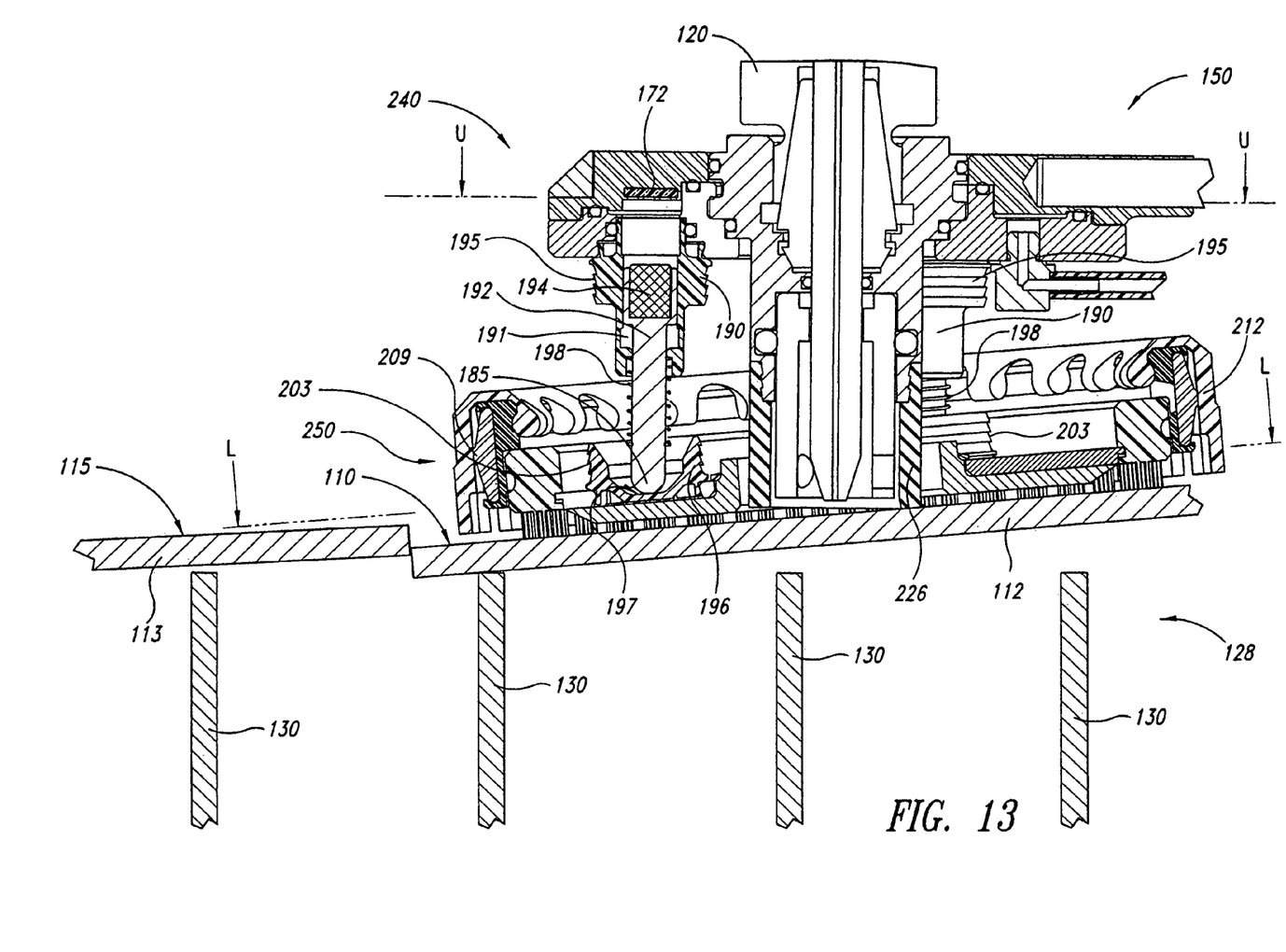
FIG. 13 is a cross-section of the contour follower of FIG. 9, shown positioned on an angled workpiece.

Due to the density of detail in FIG. 12, some of the features of the contour follower 150, and in particular, of the sensor leg assemblies 156, are not referenced in FIG. 12, but may be seen more clearly in FIGS. 10 and 13.

Each of the plurality of sensor leg assemblies 156 comprises an upper member 190 and a lower member 196. The upper member 190 includes an aperture 191 formed coaxially therethrough, and configured to receive a sensor shaft 192. The upper member 190 further comprises a mounting flange 193 configured to engage a mounting socket 189 formed in a lower surface of the housing plate 174, in a snap fit. An upper portion of the aperture 191 corresponds in position to a respective one of the plurality of sensor apertures 184 of the housing plate 174. The upper member 190 also includes a barbed region 195 configured to receive a cylindrical bellows 202 for coupling thereto.

The sensor shaft 192 is positioned within the aperture 191 of the upper member 190, such that it is free to move vertically within the upper member 190. The sensor shaft 192 includes a magnet 194 received into an aperture formed at one end thereof. Vertical movement of the sensor shaft 192 causes the magnet 194 to move closer to, or further away from, the corresponding hall-effect sensor 172. A spring 198 is constrained between a lower portion of the upper member 190 at one end and a keeper ring 200 coupled to the sensor shaft 192 at the other end, such that the sensor shaft 192 is biased in a downward direction relative to the upper member 190. Lower ends 185 of the sensor shafts 192 of each of the sensor leg assemblies 156 together define a lower machine plane L.

The lower member 196 includes a bearing surface 197 upon which the lower end 185 of the sensor shaft 192 is configured to bear. The bearing surface 197 has a surface area sufficient to accommodate some lateral movement of the lower end 185 of the sensor shaft 192. The lower member 196 further includes a mounting flange 199 configured to be received into a mounting socket 201 of a foot plate 218 via a snap fit. The lower member 196 further includes a barbed region 203 configured to receive the cylindrical bellows 202 for coupling thereto.

The cylindrical bellows 202 (see FIG. 12) is coupled at a first end to the upper member 190 at the barbed region 195 thereof, and to the lower member 196 at the barbed region 203 thereof. Hose clamps 204, or the like, serve to secure the bellows 202 in place. Each of the cylindrical bellows 202 is formed of a resilient material and is configured to accommodate expansion or contraction of the sensor leg assembly 156, as the sensor shaft 192 moves up and down within the aperture 191. The bellows is also configured to prevent fluids and other contaminants from interfering with the function of the sensor leg assembly 156.

As may be seen in FIG. 12, the aperture 191 of the upper member 190 is aligned with, and in fluid communication with, the sensor aperture 184. Accordingly, as the bellows 202 expands and contracts, air within the bellows 202 is free to pass through the air channel 178 and the vent tube 182. A passage (not shown) may be provided in the sensor shaft 192 or the upper member 190 to facilitate movement of air past the sensor shaft 192 and magnet 194 in the aperture 191. Alternatively, the shape of the upper portion of the sensor shaft 192 and magnet 194 may be selected to permit passage of air.

The foot plate assembly 158 includes a foot plate 218, a shield plate 220, and a foot brush 230. The foot plate has an annular shape and includes a plurality of mounting sockets 201, each corresponding in position to one of the plurality of sensor legs 156, and a central opening. Each mounting socket 201 is configured to receive the mounting flange 199 of the lower member 196 of the respective sensor leg 156 in a snap fit.

The shield plate 220 is formed of an abrasive resistant material, such as carbide, for example. The shield plate has an annular shape, with a raised flange 236 at an inner edge thereof. The raised flange 236 is configured to engage the central opening of the annular shaped foot plate 218 in an interference fit. Additionally, a retaining ring 234 may be pressed onto the flange 236 of the shield plate 220 to further secure the shield plate 220 to the foot plate 218.

As has been described with reference to FIG. 4, secondary spray-back resulting from passage of the waterjet 126 over a slat 130 can reflect in a fan shaped spray backward from the direction of travel. For several reasons, the energy of the spray-back diminishes in direct relation to the angle of reflectance. Thus, the highest-energy spray-back is the high-angle spray captured by the carbide sleeve 224. The shield plate 220 has a diameter sufficient to block most of the remaining spray-back that rises above the surface 110 of the workpiece 112, with a small, relatively low energy, portion being blocked by the foot brush 230. The flange 236 of the shield plate 220 deflects any spray passing between the carbide sleeve 224 and the shield plate 220.

Most of the primary and secondary spray-back is deflected by various components of the contour follower 150, as described above. One benefit of this is that the area immediately surrounding a cutting system so equipped is less prone to water spills and damage, and easier to keep dry.

Because a high percentage of cutting operations involves linear cuts along the X-axis or the Y-axis, and because the most powerful secondary spray-back occurs in cuts that are in a direction of travel incident to the slats 130, which are also generally aligned with the X an Y axes, the bottom of the shield plate 220 may wear excessively on lines corresponding to the X and Y axes. Accordingly, the shield plate may be oriented on the foot plate at any angle, and may be rotated periodically to evenly distribute the wear.

The foot brush 230 has an annular shape with an inner groove 231 formed around an inner wall thereof, and an outer groove 237. The groove 231 is configured to engage an outer rim 233 of the foot plate 218. The annular shaped foot brush 230 has a radial split 235, which allows the brush 230 to be expanded sufficiently to be positioned with the groove 231 in engagement with the rim 233 of the foot plate 218. The foot brush 230 further includes a plurality of short bristles 232 extending downward therefrom. During operation, the lower ends of the bristles 232 rest on the upper surface 110 of the workpiece 112, and so conform to a plane thereof. This plane may be referred to as the working plane, or working surface. It will be recognized that, during cutting operations, the lower machine plane L is parallel to the upper surface 110.

The collision sensor assembly 160 comprises a pressure switch support ring 210 having an annular shape and a ridge 211 formed around an inner surface thereof and configured to engage the outer groove 237 of the foot brush 230. The support ring 210 is configured to receive a pressure switch 208 therein. The pressure switch 208 is received in a channel of the support ring 210 formed around its circumference, and includes a pressure spine 209. The pressure switch 208 is configured such that pressure against the pressure spine 209 at any point around its circumference closes a switch. A control cable 216 is configured to electrically couple the pressure switch with collision sensor circuitry (not shown) for detecting closure of the switch.

A trigger skirt 206 is positioned over the support ring 210, locking the components of the collision sensor assembly 160 together, and securing the collision sensor assembly 160, together with the foot brush 230, onto the foot plate 218. The trigger skirt 206 may be configured to snap in place. The trigger skirt 206 comprises a plurality of skirt legs 212 distributed around its perimeter, and formed integral therewith. The skirt legs 212 are configured such that pressure against an outer face of one of the legs 212 will cause the respective leg to flex inward, applying pressure on the pressure spine 209, and thereby closing the sensor switch. Each of the trigger legs 212 includes a lower face 214 displaced outward, radially, from an upper portion of the leg. This configuration permits the leg 212 to flex inward in response to contact with a sheer vertical surface.

The contour follower assembly 150 comprises an upper section 240, including the nozzle nut assembly 152 and the PCB assembly 154, and a lower section 250, including the foot plate assembly 158 and the collision sensor assembly 160 (see FIG. 10). The upper section 240 is rigidly coupled to the collet 121 of the cutting head 120 by the nozzle nut 222. The lower section 250 is movably coupled to the upper section 240 by the plurality of sensor legs 156, each having an upper member 190 engaging a respective mounting socket 189 of the housing plate 174, and having a lower member 196 engaging a mounting socket 201 of the foot plate 218. The lower section 250 of the contour follower 150 is biased in a downward direction by the springs 198 of each of the sensor leg assemblies 156.

In operation, a workpiece 112 is positioned on the support grid 128 of a waterjet cutting system. The cutting head 120, with the contour follower assembly 150 coupled thereto, is lowered until the bristles 232 of the foot brush 230 make contact with the upper surface 110 of the workpiece 112. As the cutting head 120 continues to descend, the bearing surface 197 of each of the lower members 196 presses upward against the respective sensor shafts 192, moving the shafts 192 upward within the respective apertures 191, thereby compressing the springs 198. As the sensor shafts 192 rise within the apertures 191, the magnets 194 move closer to the hall-effect sensors 172. Electrical characteristics of the hall-effect sensors 172 change according to the distance of the respective magnet 194 therefrom, in a manner known in the art. The PCB 170 provides a signal via the cable 173 to a position detection circuit (not shown) indicating the position of each of the magnets 194, relative to the respective hall-effect sensor 172.

According to the embodiment described, the following values are fixed and known: the lower machine plane L, defined by the lower ends 185 of the sensor shafts 192 is a known distance from the upper surface 110 of the workpiece, defined by the bristles 232; the exit port 124 of the mixing tube 122 is a known distance, on the Z-axis, from the upper machine plane U, defined by the hall-effect sensors 172; and the magnet 194 of each of the sensor shafts 192 is a known distance from the lower machine plane, this distance defined by the length of the sensor shafts 192. Given these known values, and given the distance between the hall-effect sensors 172 and the respective magnets, which is derived from the sensor signals, the distance of the exit port 124 of the mixing tube 122 to the upper surface of the workpiece 112 can be determined with a high degree of accuracy.

The position detection circuit may be configured to provide a variety of calculations, based upon the data provided by the PCB. For example, inasmuch as the lower machine plane L lies parallel to the upper surface 110, the data from each of the plurality of hall-effect sensors 172 may be processed to establish the angle of the upper surface 110 of the workpiece 112 relative to the upper machine plane U. Alternatively, the data from each of the plurality of hall-effect sensors 172 may be averaged to determine the distance of the upper surface 110 from the exit port 124. A third alternative calculation may utilize the data from a single one of the sensors 172, in a case where the upper surface 110 of the workpiece is known to be substantially planar, to determine the distance of the upper surface 110 from the exit port 124. Design and manufacture of a circuit configured to perform these, and other calculations are within the capabilities of one having ordinary skill in the art. Accordingly, the position detection circuit will not be discussed in detail.

As was described previously, one of the challenges that has not heretofore been adequately addressed, with respect to waterjet cutting systems, is the case in which a workpiece does not lay flat on the grid of a cutting system. In the case of a large piece of sheet metal, for example, measuring perhaps many feet on a side, it is not unusual to find that such a piece is non-planar, having some portions that exhibit significant warp.

Referring now to FIG. 13, a contour follower assembly 150 is shown positioned on a workpiece 112 that is not laying flat on the upper ends of the slats 130 of a support grid. It may be seen that the lower section 250 of the device conforms to the upper surface 110 of the workpiece 112, conforming thereby to the upper surface 110 of the workpiece 112 over which the cutting head, including the cutting head 120 and the mixing tube 122 must travel. Given the signals provided by the hall-effect sensors 172, which are directly related to the position of the magnets 194 relative to the sensors 172, the angle of the upper surface 110, relative to the X-Y plane, can also be determined with a very high degree of accuracy.

In the case of a waterjet cutting system having three axes of control, namely, X, Y, and Z, the position of the mixing tube 122 can be adjusted in the Z-axis to place the exit port 124 at an optimum distance S (see FIG. 5) from the upper surface 110 of the workpiece at the point where the waterjet impacts the workpiece, regardless of the angle of the workpiece 112. This is not possible with conventional sensors, which measure from a single point, some distance from the mixing tube 122.

In the case of a five-axis system including rotation around X and Y axes, such as that described with reference to FIGS. 6 and 7, the axial angle of the mixing tube 122 can be adjusted to compensate for a change in the L plane, and by extension, the plane of the upper surface 110 of the workpiece 112. Additionally, accurate compensation for taper and trailback can be performed, independent of changes in the upper plane 110.

It will be recognized that, in cases such as that described with reference to FIG. 13, for example, the workpiece 112 will be subject to movement in the Z-axis as the cutting process proceeds. FIG. 13 illustrates a case in which a workpiece does not lie flat on the grid 128. A segment 113 supporting a raised portion of the workpiece 112 has been cut away, allowing the workpiece 112 to drop. The upper surface 115 of the segment 113 now lies at a different plane than the upper surface 110 of the workpiece 112. In such a case, not only must the contour follower 150 readjust to a new angle, but there is also a danger of collision, as some cut edges rise above the upper surface 110.

Figure 14:
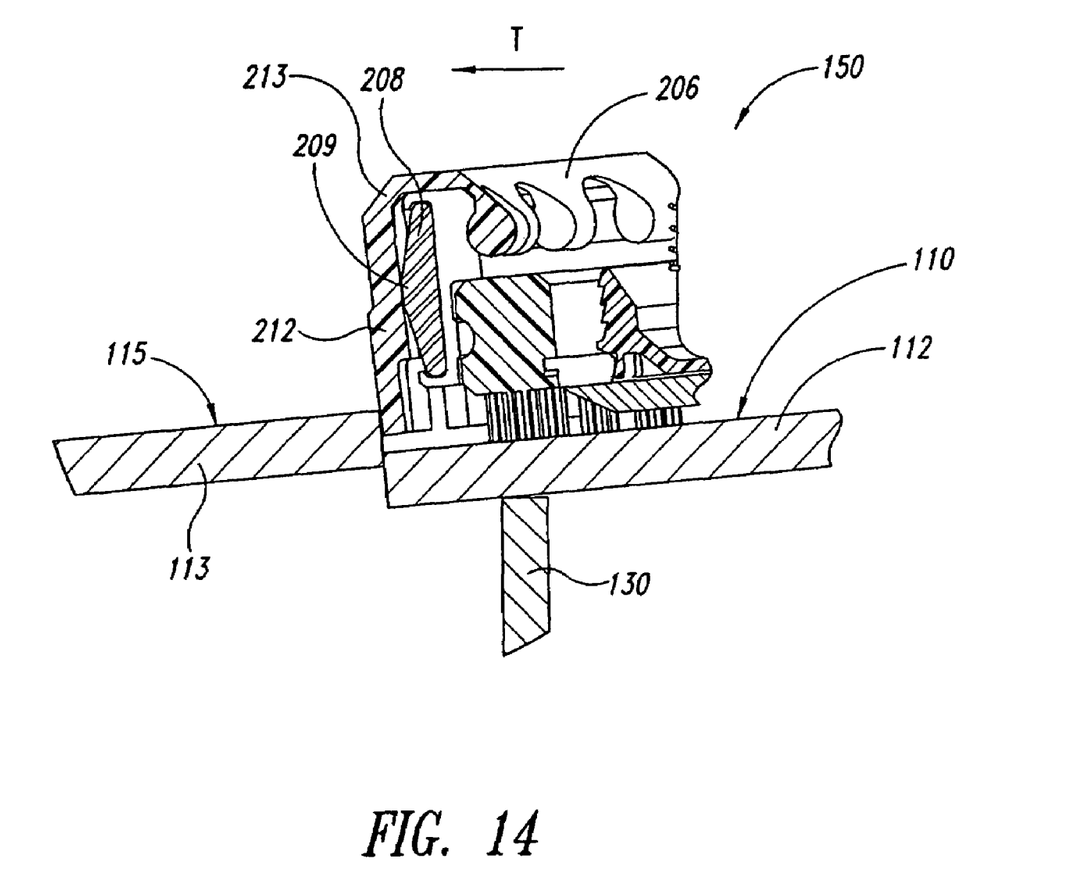
FIG. 14 shows an enlarged view of a small portion of the contour follower of FIG. 13.

FIG. 14 shows an enlarged view of a small portion of the contour follower 150 in the collision condition described above with reference to FIG. 13. As the cutting head, with the contour follower 150 coupled thereto, travels in direction T, a trigger leg 212 contacts a raised segment 113 of the workpiece 112. The trigger leg 212 flexes inward at a region 213 where the leg 212 joins the trigger skirt 206. The leg 212 presses against the spine 209 of the pressure switch 208, causing the switch 208 to close an electrical circuit. Associated collision sensor circuitry is configured to shut down the drive of the cutting system in response to activation of the pressure switch 208, preventing damage to the system.

The embodiment described with reference to FIGS. 9-14 includes many parts that are coupled via interference or snap fit. This facilitates quick and simple disassembly for servicing or replacement of individual components or assemblies, without the need to remove fasteners, etc. However, other embodiments may incorporate threaded fasteners, retainers, threaded engagements, or any other device or method of connection, without deviating from the scope of the invention.

The embodiment described employs hall-effect sensors, which cooperate with magnets coupled to the sensor shafts. An individual having ordinary skill in the art will recognize that many types of sensors or signal generating devices may be used in place of the hall-effect sensors and magnets. For example, configurations employing strain gauges, potentiometers, optical sensors, accelerometers, or other sensing devices may be used. Design and manufacture of such alternate embodiments are within the skill of such an individual, and are within the scope of the invention.

An examination of the figures, especially FIGS. 12 and 13, will reveal several "O" rings that were not specifically described. One having ordinary skill in the art will recognize the value of providing seals at various points in such a device, and the function of such "O" rings will be clear to such an individual.

Alternate embodiments of the invention may not include all of the components described, or may incorporate components or assemblies described herein in systems bearing little obvious resemblance to the embodiment pictured. Such alternate embodiments also fall within the scope of the invention. For example, a cutting or drilling system employing some other cutting method, such as plasma or mechanical saw, for example, might advantageously incorporate some of the principles described with reference to the present embodiment.

Alternatively, an embodiment of the invention might incorporate a system in which a tool is required to be oriented with respect to a surface for measuring or cleaning. For example, an automated waterjet cleaning device might be required to be maintained at a precise angle and distance from a surface to effectively remove debris, coatings, or corrosion, without damaging the surface. Other applications may also occur to one having ordinary skill in the art, in which the features described with reference to the disclosed embodiment may be advantageously incorporated. Such applications also fall within the scope of the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A sensor leg assembly, comprising:
   an upper member having an axially traversing aperture;
   a sensor shaft positioned within the aperture and configured to move axially within the aperture, the sensor shaft having first and second ends, the first end having a cavity formed axially with the shaft;
   a magnet positioned within the cavity; and
   a lower member having a bearing surface configured to receive the second end of the sensor shaft.

2. The sensor leg assembly of claim 1, further comprising a cylindrical bellows coupled at a first end to the upper member and at a second end to the lower member, and substantially enclosing the sensor shaft.

3. The sensor leg assembly of claim 1 wherein the upper member comprises a mounting flange configured to be received into a first mounting socket of a contour follower assembly, and wherein the lower member comprises a mounting flange configured to be received into a second mounting socket of the contour follower assembly.

4. A sensor leg assembly, comprising:
   an upper member having an axially traversing aperture;
   a sensor shaft positioned within the aperture and configured to move axially within the aperture, the sensor shaft having first and second ends, the first end having a cavity formed axially with the shaft;
   a magnet positioned within the cavity;
   a lower member having a bearing surface configured to receive the second end of the sensor shaft; and
   a cylindrical bellows coupled at a first end to the upper member and at a second end to the lower member, and substantially enclosing the sensor shaft.

5. A sensor leg assembly, comprising:
   an upper member having an axially traversing aperture and a first mounting flange configured to be received into a first mounting socket of a contour follower assembly;
   a sensor shaft positioned within the aperture and configured to move axially within the aperture, the sensor shaft having first and second ends, the first end having a cavity formed axially with the shaft;
   a magnet positioned within the cavity; and
   a lower member having a bearing surface configured to receive the second end of the sensor shaft, and a second mounting flange configured to be received into a second mounting socket of the contour follower assembly.

* * * * *